Dec. 24, 1935.  H. R. OSBORNE  2,025,471
CORRECTION OF POWER FACTOR
Filed July 3, 1934

INVENTOR:
HAROLD R. OSBORNE.

BY: Marks & Clerk
ATTORNEYS.

Patented Dec. 24, 1935

2,025,471

UNITED STATES PATENT OFFICE 2,025,471

CORRECTION OF POWER FACTOR

Harold R. Osborne, Toronto, Ontario, Canada, assignor to Ferranti Electric, Limited, Mount Dennis, Ontario, Canada Application July 3, 1934, Serial No. 733,689
In Canada May 4, 1934

3 Claims. (Cl. 172—246)

This invention relates to the use of capacitances for the correction of power factor, and more particularly to the use of capacitances in circuits in series with energy using devices or loads which require ballasts.

Gaseous tubes and arcs are examples of such devices or loads. Their characteristics are such that as the current passed through them increases, their impedance decreases. As a consequence, a voltage much higher than that necessary to maintain normal load current must be applied to start the current, and the voltage must automatically be reduced to the value required to maintain the normal full load current.

If the load is fed directly from a constant potential source, the voltage across the load is usually controlled by connecting in series with it a resistance or a choke coil. If it is fed by a transformer it is usual to employ a transformer of high reactance, the transformer secondary voltage being high enough to start the current and falling as the current increases, the transformer being so designed that the circuit attains a stable condition at the required operating current value. The transformer reactance thus acts as an inductive ballast in the circuit. This is the usual practice in energizing gaseous tubes used in signs or for illumination. The disadvantage in using choke coils or high reactance transformers is that a low power factor current is taken from the supply mains.

The present invention has for its object to provide improved means for overcoming the above mentioned disadvantages of existing arrangements, and with this end in view the invention consists in the combination and arrangement of parts hereinafter described and more particularly pointed out in the appended claims.

Figure 1:
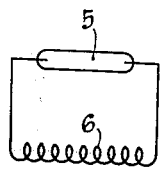
Figure 2:
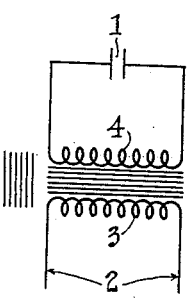
Figure 2:
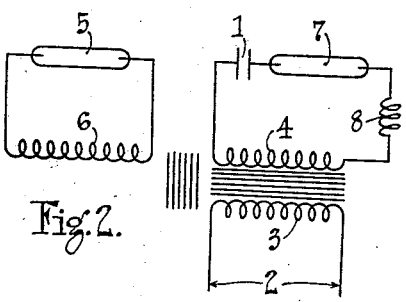
Figure 3:
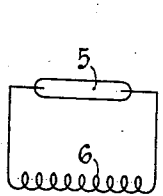

Referring now to the accompanying drawing which illustrates a known arrangement, and, by way of example, various embodiments of the present invention, Figure 1 is a diagram illustrating a known arrangement, Figure 2 is a diagram of one embodiment of the improved arrangement, Figures 3, 4, 5 and 6 are diagrams showing various modifications of the applicant's invention.

For purposes of comparison a known arrangement will first be described with reference to Figure 1. According to this known arrangement, a static condenser 1, is connected across the supply leads 2 either directly or through a transformer having a primary 3 and secondary 4 (Figure 1). Alternatively the secondary may be connected as an extension of the primary winding. The load indicated at 5, is connected across the highly reactive winding 6 and if the capacity 1 is of the correct value, a fairly high power factor will be obtained in the primary circuit. This application is well known. In circuit 6 the current lags behind the voltage, while in circuit 4 it is leading, the wattless volt amperes in each of the two circuits being approximately equal. This method is satisfactory when used with certain types of loads, but perfect correction cannot be obtained when operating certain other loads such as gaseous tubes. This appears to be due to the fact that the tube current has a very bad wave shape or form factor, and for this reason the method does not give proper correction. The leading wattless current in the circuit containing the condenser 1 cannot be made to correctly balance the lagging current in the loaded inductive circuit 6, because it has not the same wave shape or form factor.

Applicant has discovered and put into practice the fact that by putting in circuit 4, in series with the condenser 1, a load 7 of the same nature as load 5 in circuit 6, a leading current of the same magnitude and shape as the lagging current in circuit 6 can be obtained. This arrangement is shown in Figure 2. The currents balance each other very closely in the transformer and a high power factor is obtained.

If a circuit voltage sufficient to start the flow of current in the circuit is used, a stable condition will be obtained in the circuit with a capacity alone employed as ballast. It is the practice in some applications to use an auxiliary means of starting by changing the load characteristics so that a current will start to flow with a lower voltage impressed. This results in a saving, as the auxiliary circuit rating may be very small. This auxiliary starting may be accomplished by ionizing the gaseous part of the circuit in whole or in part by the application of a higher voltage at one or more points, or by other known means.

When advantage is taken of the use of lower circuit voltages by means of auxiliary starting, applicant has found that operation is unstable with capacity impedance unless the resistance of the circuit is made very high. This is apparently due to oscillations produced by the capacity impedance and the inherent inductance of the circuit. Applicant has overcome this condition by including in series with the capacity and load a certain amount of inductance as indicated at 8.

This inductance need be only sufficient to provide the necessary damping and its value will vary with the type of load and the circuit voltage, the necessary value being less as the circuit voltage approaches the voltage which would be necessary to start the current if no auxiliary means of starting were employed.

For proper correction the condenser 1 is given a capacity which balances out the effect of the inductance in circuit 4 and in circuit 6 and the wattless component of the exciting current of the transformer. The inductance 8 may be connected in as a choke coil or may be obtained by making the winding of sufficiently high reactance.

The rating in volt amperes of circuit 4 is approximately the same as that of circuit 6 and the added load 7 may be as large as the load 5. Adding the useful load 7 in circuit 4 results in doubling the useful load taken from the transformer and also causes the current drawn from the supply mains to have approximately unity power factor. If the voltage required by the load is not within the range of economical condenser voltages, the circuit may be modified as in one method shown in Figure 3. A transformer 9 is connected with its primary in series with the condenser 1 and the added load 7 connected to its secondary.

Figure 4:
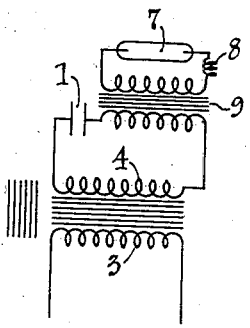
Figure 4:
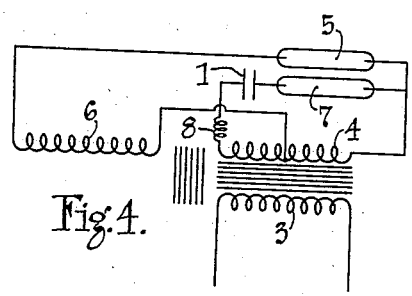

Figure 2 may be modified as shown in Figure 4, to have circuits 4 and 6 interconnected electrically. This enables an economy of transformer material to be made without altering its operation. The inductance 8 necessary in circuit 4 may be included as a choke coil or by giving a high reactance to that part of the transformer winding 4 which is in circuit with the condenser 1, but which is not common to both load circuits.

Figure 5:
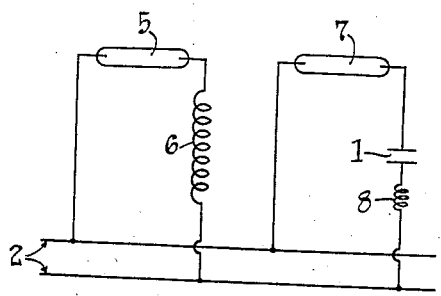

In cases in which it is not possible or not convenient to connect two or more loads in circuits containing respectively a preponderance of inductance and of capacity on the same transformer, the load may be connected to separate circuits, some inductive and having a lagging power factor, and some containing a preponderance of capacity and having a leading power factor so that the power factor of the current taken from the supply mains for the total load is high. This arrangement is indicated in Figure 5 in which the load 5 and winding 6 are connected in series across the supply mains 2, and the added load 7, condenser 1 and inductance 8 are connected in series across the mains.

Figure 6:
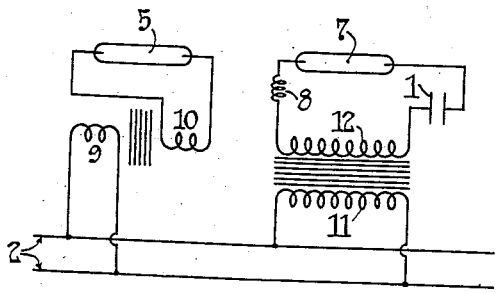

A similar arrangement with transformers interposed between the loads and the mains is shown in Figure 6. In this case one half 5 of the total load may be connected to a transformer 9—10 of high reactance and the other half 7 to a transformer 11—12 with a measure of reactance and having capacity 1 and, if necessary, inductance 8, in series in the transformer secondary 12.

It will be understood that the foregoing description and accompanying drawing are given by way of example only, and that other modifications within the scope of the appended claims may be resorted to without departing from the spirit of the invention.

What I claim is:—

1. The combination of one or more circuits each consisting of a load having negative resistance characteristics in series with a sufficient preponderance of capacity to act as proper ballast, with one or more circuits each consisting of a load having negative resistance characteristics in series with inductive ballasts, and a transformer supplying all circuits so that the resultant power factor of the transformer primary is nearer unity than that of the individual circuits.

2. The combination of one or more circuits each consisting of a load having negative resistance characteristics in series with a sufficient preponderance of capacity to act as ballast, with one or more circuits each consisting of a load having negative resistance characteristics in series with inductive ballast, and a common source for supplying all circuits resulting in a higher power factor current being taken for the total load than for the individual circuits.

3. An electrical arrangement for operating loads of negative resistance characteristics comprising a pair of circuits supplied with alternating current from a common source, inductive reactance arranged in series with a load of negative resistance characteristics in one of said circuits, and capacity reactance arranged in series with an equal load of the same characteristics in the other of said circuits, said capacity reactance being of such value as to neutralize the effect of the inductive reactance.

HAROLD R. OSBORNE.